(12) United States Patent
Mattmuller et al.

(10) Patent No.: US 10,787,084 B2
(45) Date of Patent: Sep. 29, 2020

(54) BUSBAR WITH DISSIMILAR MATERIALS

(71) Applicant: Ford Global Technologies, LLC, Dearborn, MI (US)

(72) Inventors: Stephenson Tyler Mattmuller, Detroit, MI (US); Michael John O'Connor, Keego Harbor, MI (US); Dylan Erb, Dearborn, MI (US); Jacob Wiles, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 656 days.

(21) Appl. No.: 15/461,817

(22) Filed: Mar. 17, 2017

(65) Prior Publication Data

US 2018/0269671 A1 Sep. 20, 2018

(51) Int. Cl.
*H02G 5/00* (2006.01)
*B60L 50/64* (2019.01)

(52) U.S. Cl.
CPC .............. *B60L 50/64* (2019.02); *H02G 5/005* (2013.01); *Y02T 10/7005* (2013.01)

(58) Field of Classification Search
CPC ................................ H02G 5/005; B60L 50/64
USPC ......................................................... 307/10.1
See application file for complete search history.

(56) References Cited

U.S. PATENT DOCUMENTS

| | | |
|---|---|---|
| 2,790,656 A | 4/1957 | Cook |
| 5,672,920 A * | 9/1997 | Donegan ............... H02M 7/003 307/147 |
| 6,538,203 B1 | 3/2003 | Nölle et al. |
| 7,413,489 B1 | 8/2008 | LaSalvia et al. |
| 7,652,552 B2 * | 1/2010 | Fussl ................... H01H 85/044 337/186 |

(Continued)

FOREIGN PATENT DOCUMENTS

CN 201204069 3/2009

OTHER PUBLICATIONS

Csanyi, Edvard, Copper or aluminium? Which one to use and when?, Electrical Engineering Portal, retrieved from http://electrical-engineering-portal.com/copper-or-aluminium on Jul. 21, 2016.

(Continued)

*Primary Examiner* — Alfonso Perez Borroto
(74) *Attorney, Agent, or Firm* — David Kelley, Esq.; Carlson, Gaskey & Olds, P.C.

(57) ABSTRACT

An exemplary busbar assembly includes a first strip including a first material, and a second strip including a second material different than the first material. The first strip extends continuously from a first connector portion to a second connector portion. The first connector portion electrically connects the first strip to a first structure. The second connector portion electrically connects the first strip to a second structure. The first and second strips are both configured to communicate electric current. An exemplary current communication method includes communicating electrical current using both a first strip and a second strip of a busbar. The first strip is made of a first material and bonded to the second strip made of a second material. The first strip extends continuously from a first to a second connector portion. The first connector portion electrically connects to a first structure, and the second connector portion electrically connects to a second structure.

20 Claims, 3 Drawing Sheets

(56) References Cited

U.S. PATENT DOCUMENTS

| | | | |
|---|---|---|---|
| 7,766,673 B1* | 8/2010 | Dumont | H01R 13/68 439/76.2 |
| 8,207,454 B2* | 6/2012 | Darr | H05K 7/026 174/520 |
| 8,573,987 B1* | 11/2013 | Schweitzer | H01R 9/226 439/457 |
| 8,999,081 B2 | 4/2015 | Willis et al. | |
| 9,287,547 B2* | 3/2016 | Widhalm | H01M 2/202 |
| 9,853,435 B1* | 12/2017 | Burkman | H01M 2/1077 |
| 10,584,775 B2* | 3/2020 | Steinberger | B60K 6/387 |
| 2008/0310121 A1* | 12/2008 | Yamashita | H05K 7/026 361/720 |
| 2010/0038133 A1* | 2/2010 | Senk | B60R 16/0238 174/72 B |
| 2010/0085687 A1* | 4/2010 | Shannon | H05K 7/1457 361/624 |
| 2011/0001355 A1* | 1/2011 | Abadia | B60L 50/00 307/10.1 |
| 2011/0100706 A1* | 5/2011 | Matsui | H05K 7/026 174/541 |
| 2012/0068668 A1* | 3/2012 | Kittell | B60L 53/11 320/162 |
| 2013/0029501 A1* | 1/2013 | I | H05K 7/026 439/76.2 |
| 2014/0000927 A1* | 1/2014 | Hashimoto | H02G 5/005 174/68.2 |
| 2015/0016028 A1* | 1/2015 | Darr | H02G 3/14 361/626 |
| 2015/0069829 A1* | 3/2015 | Dulle | H02J 7/0021 307/9.1 |
| 2015/0244044 A1* | 8/2015 | Boddakayala | H01M 10/613 429/120 |
| 2016/0073520 A1* | 3/2016 | Darr | H05K 7/026 361/752 |
| 2016/0181777 A1* | 6/2016 | Kawamura | H02G 3/086 174/50 |
| 2016/0204400 A1* | 7/2016 | Baek | B60L 50/66 429/159 |
| 2016/0280088 A1* | 9/2016 | Callicoat | B60L 58/26 |
| 2016/0315298 A1* | 10/2016 | Lohr | H01M 2/206 |
| 2017/0025661 A1* | 1/2017 | Gibeau | B60L 58/26 |
| 2017/0105306 A1* | 4/2017 | Takahashi | H01M 2/206 |
| 2017/0179548 A1* | 6/2017 | Lee | H01M 10/058 |
| 2018/0065500 A1* | 3/2018 | Mastrandrea | H01M 10/625 |
| 2018/0233789 A1* | 8/2018 | Iqbal | H01M 10/6554 |
| 2018/0269454 A1* | 9/2018 | De Souza | H01M 2/206 |
| 2018/0269671 A1* | 9/2018 | Mattmuller | H02G 5/005 |
| 2020/0153219 A1* | 5/2020 | Baseri | H01M 2/206 |
| 2020/0161728 A1* | 5/2020 | Wang | B60L 50/64 |

OTHER PUBLICATIONS

U.S. Appl. No. 15/216,111, filed Jul. 21, 2016.

\* cited by examiner

BUSBAR WITH DISSIMILAR MATERIALS

TECHNICAL FIELD

This disclosure relates to a busbar assembly used within a vehicle and, more particularly, to a busbar having dissimilar materials.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle can include a plurality of battery cell assemblies arranged in one or more battery arrays. Busbars can be used to distribute power to and from the battery cell assemblies, and to and from the battery pack. Busbars are typically copper and can add significant weight to the electrified vehicle.

SUMMARY

A busbar assembly according to an exemplary aspect of the present disclosure includes, among other things, a first strip including a first material, and a second strip including a second material different than the first material. The first strip extends continuously from a first connector portion to a second connector portion. The first connector portion electrically connects the first strip to a first structure. The second connector portion electrically connects the first strip to a second structure. The first and second strips are both configured to communicate electric current.

In a further non-limiting embodiment of the foregoing assembly, the second strip is directly adjacent to the first strip.

In a further non-limiting embodiment of any of the foregoing assemblies, the second strip is bonded directly to the first strip.

In a further non-limiting embodiment of any of the foregoing assemblies, the first material and the second material are a metal or a metal alloy.

In a further non-limiting embodiment of any of the foregoing assemblies, the first material comprises copper and the second material comprises aluminum.

In a further non-limiting embodiment of any of the foregoing assemblies, the first material forms a non-conductive oxide layer under given atmospheric conditions at a first rate, and the second material forms a non-conductive oxide layer under the given atmospheric conditions at a second rate that is faster than the first rate.

In a further non-limiting embodiment of any of the foregoing assemblies, the first structure is a first traction battery terminal and the second structure is a second traction battery terminal. The first connector portion of the first strip is secured directly to the first traction battery terminal. The second connector portion of the first strip is secured directly to the second traction battery terminal.

In a further non-limiting embodiment of any of the foregoing assemblies, the first and second strips extend nonlinearly from the first traction battery terminal to the second traction battery terminal.

In a further non-limiting embodiment of any of the foregoing assemblies, the first strip extends from the first to the second connector portion along a longitudinal axis, and a cross-sectional area of a section taken perpendicular to the longitudinal axis remains consistent from the first to the second connector portion.

In a further non-limiting embodiment of any of the foregoing assemblies, the second strip extends along a longitudinal axis from a first position adjacent the first connector portion of the first strip to a second position adjacent the second connector portion of the first strip.

In a further non-limiting embodiment of any of the foregoing assemblies, the first strip has an overall longitudinal length that is the same as an overall longitudinal length of the second strip.

A current communication method according to another exemplary aspect of the present disclosure includes, among other things, communicating electrical current using both a first strip and a second strip of a busbar. The first strip is made of a first material and is bonded to the second strip made of a second material. The first strip extends continuously from a first connector portion to a second connector portion. The first connector portion electrically connects to first structure. The second connector portion electrically connects to a second structure.

In a further non-limiting embodiment of the foregoing method, the second strip extends continuously from the first structure to the second structure.

In a further non-limiting embodiment of any of the foregoing methods, the first strip extends from the first to the second connector portion along a longitudinal axis. A cross-sectional area of a section of the busbar taken perpendicular to the longitudinal axis remains consistently sized from the first to the second connector portion.

In a further non-limiting embodiment of any of the foregoing methods, the first and second battery structures are traction battery terminals.

In a further non-limiting embodiment of any of the foregoing methods, the first material and the second material are metallic materials, and the first strip is metallurgically bonded to the second strip.

In a further non-limiting embodiment of any of the foregoing methods, the first material includes copper and the second material comprises aluminum.

In a further non-limiting embodiment of any of the foregoing methods, the first strip has an overall longitudinal length that is the same as an overall longitudinal length of the second strip.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a busbar assembly for a vehicle, such as an electrified vehicle. The busbar assembly includes strips of different materials. The strips are bonded to one another to facilitate electrical current flow between the strips. One of the strips is made of a material that can effectively electrically couple the busbar assembly to a battery terminal. Another of the strips is made of a relatively light material, such as aluminum, which can reduce an overall weight of the busbar assembly.

Figure 1:
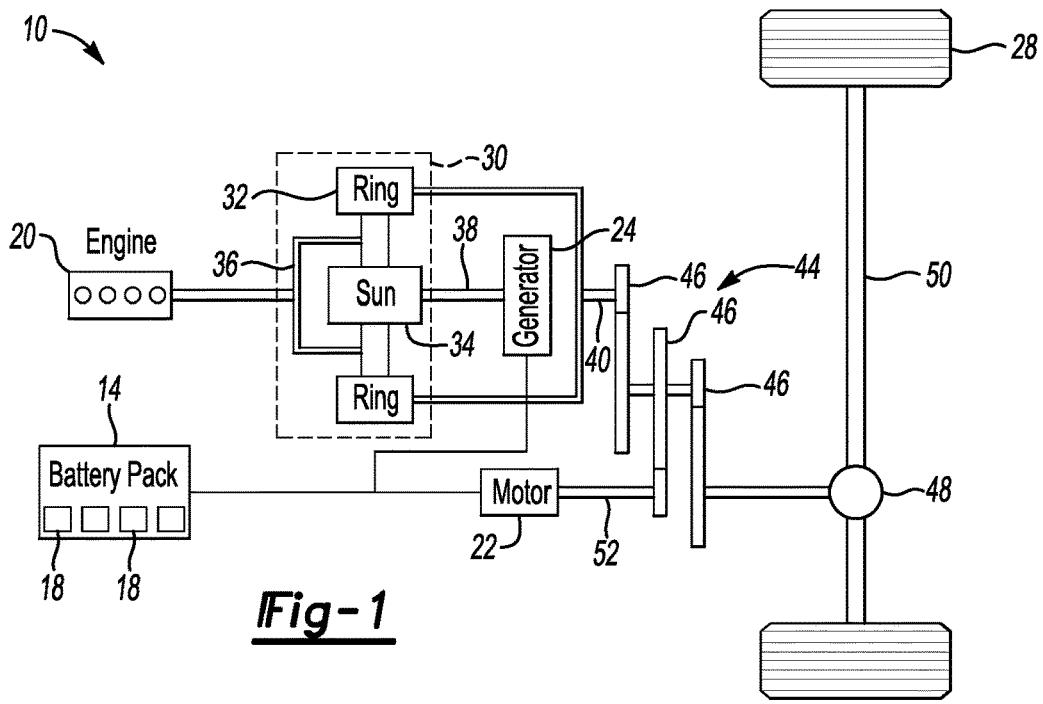
FIG. 1 illustrates a schematic view of an example powertrain of an electrified vehicle.

Referring to FIG. 1, a powertrain 10 of a hybrid electric vehicle (HEV) includes a traction battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
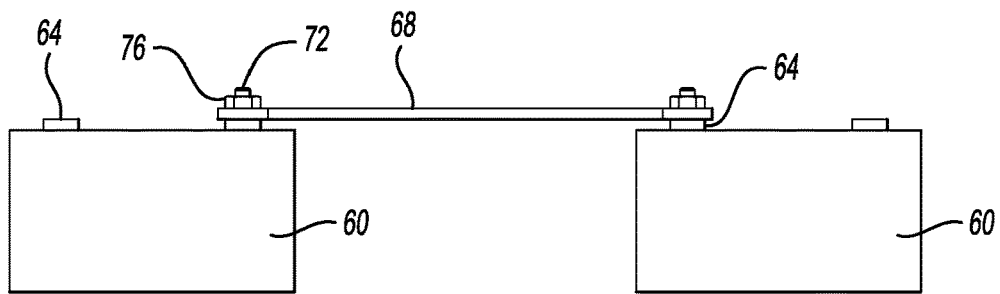
FIG. 2 shows a partially schematic view of a busbar assembly electrically connected to a terminal of a first battery cell assembly within a battery pack of the FIG. 1 powertrain, and additionally electrically connected to a terminal of a second battery cell assembly within the battery pack.
Figure 3:
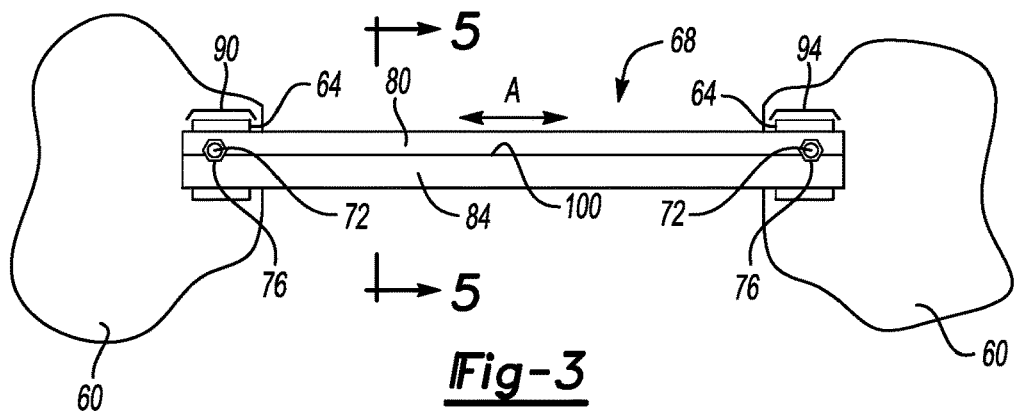
FIG. 3 illustrates a top view of FIG. 2 showing the busbar assembly electrically connected to the terminals.
Figure 4:
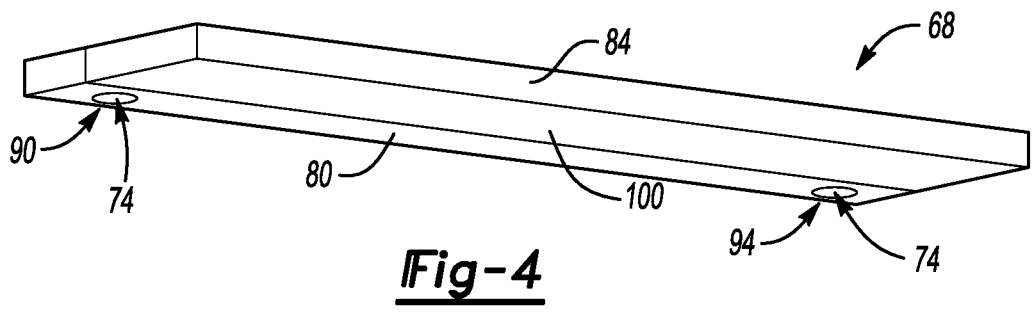
FIG. 4 illustrates a perspective view of the busbar assembly of FIG. 2.

Referring now to FIGS. 2 to 4 with continuing reference to FIG. 1, the battery arrays 18 include a plurality of battery cell assemblies 60. Terminals 64 extend from the battery cell assemblies 60. Several of the battery cell assemblies 60 can be positioned adjacent each other along an axis.

A busbar assembly 68 can be used to electrically connect and couple the terminal 64 of one of the battery cell assemblies 60 to the terminal 64 of another of the battery cell assemblies 60. In this example, when electrically coupled to the terminals 64, the busbar assembly 68 is the busbar assembly 68 is electrically contacting the terminals 64.

In this disclosed, non-limiting embodiment a threaded terminal connector 72 is used to couple the busbar assembly 68 to each of the terminals 64. At each terminal 64, the threaded terminal connector 72 extends through an aperture 74 in the busbar assembly 68. A nut 76 is torqued down over the threaded terminal connector 72 to clamp the busbar assembly 68 against the terminal 64. In another example, the busbar assembly 68 is welded to the terminals 64.

Although shown as connected to the terminals 64 of different battery cell assemblies 60, the busbar assembly 68 could be used in other ways. The busbar assembly 68 could, for example, be used to additionally distribute power to and from the traction battery pack 14. In such an example, the busbar assembly 68 could electrically couple the traction battery pack 14 to a structure outside the traction battery pack 14, such as an inverter. The busbar assembly 68 could also electrically connect more than two terminals. Thus, this disclosure should not be construed at limited to busbars that exclusively connect to the terminals 64. The busbar assembly 68 could be used to electrically couple various other types of structures.

The busbar assembly 68 includes, among other things, a first strip 80 of a first material, and a second strip 84 of a second material. The first material of the first strip 80 is different than the second material of the second strip 84. The busbar assembly 68 thus comprises dissimilar materials.

In this example, the first strip 80 and the second strip 84 are metal or metal alloys that can convey electric current but have different ampacities. In particular, the material of the first strip 80 is copper and the material of the second strip 84 is aluminum. Other examples of the busbar assembly 68 could include other types and combinations of materials.

Notably, the material of the second strip 84 is lighter than the material of the first strip 80. The busbar assembly 68 is thus lighter than a similarly sized busbar made of exclusively the material of the first strip 80. Incorporating the second strip 84 of the second material thus can reduce the weight of the busbar assembly 68 versus a busbar comprising exclusively the material of the first strip 80.

In the exemplary non-limiting embodiment of FIGS. 2 to 4, the first strip 80 includes a first connector portion 90 of the busbar assembly 68. The first connector portion 90 connects the busbar assembly 68 to a terminal 64 of one of the battery cell assemblies 60. The first strip 80 further includes an opposing, second connector portion 94 of the busbar assembly 68. The second connector portion 94 connects to the terminal 64 of another of the battery cell assemblies.

The busbar assembly 68 is electrically coupled to the terminal 64 of the battery cell assemblies 60 through the first connector portion 90 and the second connector portion 94. When electrically coupled, the busbar assembly 68 can communicate electrical current from the busbar to the terminals 64, or communicate electrical current from the terminals 64 to the busbar assembly 68.

The connector portions 90, 94 are the portions of the busbar assembly 68 providing the apertures 74 that receive the threaded terminal connectors 72. In this exemplary embodiment, the first strip 80 provides an entire circumferential perimeter of the apertures 74. In another example, the second strip 84 provides some portion of the circumferential perimeter. Incorporating the first strip 80 into the busbar assembly 68 provides an effective connection interface to the terminals 64, while the incorporation of the second strip 84 provides a weight reduction in the busbar relative to a busbar comprising exclusively the material of the first strip 80.

The second strip 84 communicates electrical current within the busbar assembly 68, but is not substantially relied on to electrically couple the busbar assembly 68 to the terminals 64. Exposed surfaces of an aluminum material can, as is known, oxidize and inhibit current passage. Thus, if the second strip 84 is aluminum, oxidation could inhibit current flow between the terminal 64 and the second strip 84. Accordingly, even if the second strip 84 provides some portion of the apertures 74, the areas of contact between the first strip 80 and the terminals 64 would primarily be relied on to communicate current between the terminals 64 and the busbar assembly 68. If the material of the first strip 80 forms a non-conductive layer, that layer is formed much slower than the rate at which aluminum forms a non-conductive layer.

In some examples, the material of the second strip 84 forms a non-conductive oxide layer under given atmospheric conditions at a first rate, and the material of the first strip 80 forms a non-conductive oxide layer under the given atmospheric conditions at a second rate that is slower than the first rate. The first material of the first strip 80 is thus better suited to connect the busbar assembly 68 to the terminal 64.

In this example, the first strip 80 extends longitudinally along an axis A from the first connector portion 90 to the second connector portion 94. Notably, the first strip 80 extends continuously from the first connector portion 90 to the second connector portion 94. The second strip 84 also extends continuously from a first position that is adjacent the first connector portion 90 of the first strip 80 to a second position that is adjacent the second connector portion 94 of the first strip 80. The first strip 80 thus has a longitudinal length that is the same as the longitudinal length of the second strip 84. The longitudinal length of the first strip 80 and the second strip 84 can be sized to span between the terminals 64 of the battery cell assemblies 60.

To manufacture the busbar assembly 68, the first strip 80 is cut to a desired longitudinal length, the second strip 84 is cut to a desired longitudinal length, and the first strip 80 is then bonded to the second strip 84 along the interface 100. Alternatively, the first strip 80 is bonded to the second strip 84 and then cut to the desired length.

The first strip 80 is directly adjacent the second strip 84 and is bonded directly to the second strip 84 along a bond interface 100. In particular, the first strip 80 can be metallurgically bonded to the second strip 84. The metallurgical bond inhibits oxidation of the second strip 84 along the interface 100. Thus, current flow between the first strip 80 and the second strip 84 is effectively uninhibited by oxidation.

Current within the busbar assembly 68 is free to move through the interface 100 between the first strip 80 and the second strip 84. The metallurgical bonding facilitates this movement. Further, the exemplary interface 100 is consistent so that thermal energy will conduct across the interface 100 as the first strip 80 transitions to the second strip 84.

Techniques for metallurgical bonding are often times difficult to apply and can require complex machinery. However, because the exemplary busbar assembly 68 utilizes the first strip 80 and the second strip 84, there is substantially only one interface requiring metallurgical bonding. Extending the first strip 80 continuously from the first connector portion 90 to the second connector portion 94 can, among other things, lessen manufacturing complexity associated with providing the busbar assembly 68.

After the first strip 80 is bonded to the second strip 84 along the interface 100, the busbar assembly 68 can undergo a machining operation that forms the apertures 74 that receive the threaded terminal connectors 72. Of course, the apertures 74 could be also formed prior to the bonding, prior to the cutting of the first strip 80 to the desired longitudinal length, or at some other time.

Figure 5:
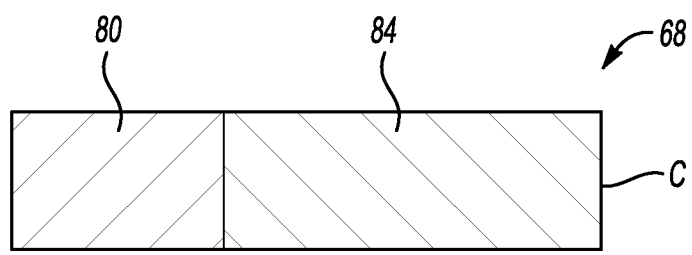
FIG. 5 illustrates a section view at line 5-5 in FIG. 3.

Referring now to FIG. 5 with continuing reference to FIG. 3, a section through the busbar assembly 68 taken perpendicularly to the longitudinal axis A has a total cross-sectional area C. In this example, the cross-sectional area of the first strip 80 and the second strip 84 remains consistent along the axis A from the first connector portion 90 to the second connector portion 94.

The cross-sectional area C of the busbar assembly 68 has an associated ampacity. A different busbar comprised exclusively of, for example, a copper material may be able to provide the same ampacity with a smaller cross-sectional area. However, since the busbar assembly 68 includes the second strip 84 of a relatively lightweight material, the busbar assembly 68 may have a reduced weight compared to the exclusively copper busbar having the same ampacity.

In one specific example, the exclusively copper busbar has a cross-sectional area of 34 square millimeters and a fixed ampacity. The same ampacity in an all aluminum busbar would require the all aluminum busbar to have a cross-sectional area of 53.04 square millimeters (i.e., 34 square millimeters multiplied by 1.56).

There is thus some tradeoff between cross-sectional area and weight when sizing the cross-sections of the first strip 80 and the second strip 84. That is, while the busbar assembly 68 is lighter than an all copper busbar with the same ampacity, the cross-section of the busbar assembly 68 is greater than the all copper busbar with the same ampacity. The increase in the cross-sectional area, however, may be offset by the weight reduction.

Figure 6:
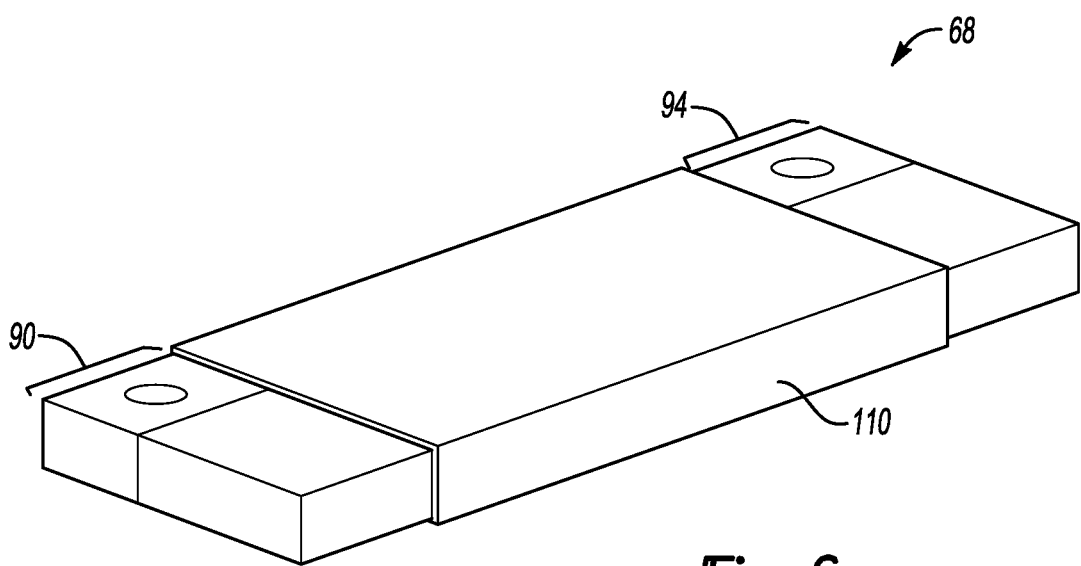
FIG. 6 illustrates the bus bar assembly of FIG. 2 incorporating cladded portions.

Referring now to FIG. 6, in some examples, the busbar assembly 68 can include portions covered by a cladding 110. The cladding 110 can be, for example, a polymer cladding covering the portions of the busbar assembly 68 between the first connector portion 90 and the second connector portion 94. The cladding 110 can protect and electrically isolate these portions of the busbar assembly 68 from structures other than the terminals 64. This can prevent or inhibit the busbar assembly 68 from shorting.

Figure 7:
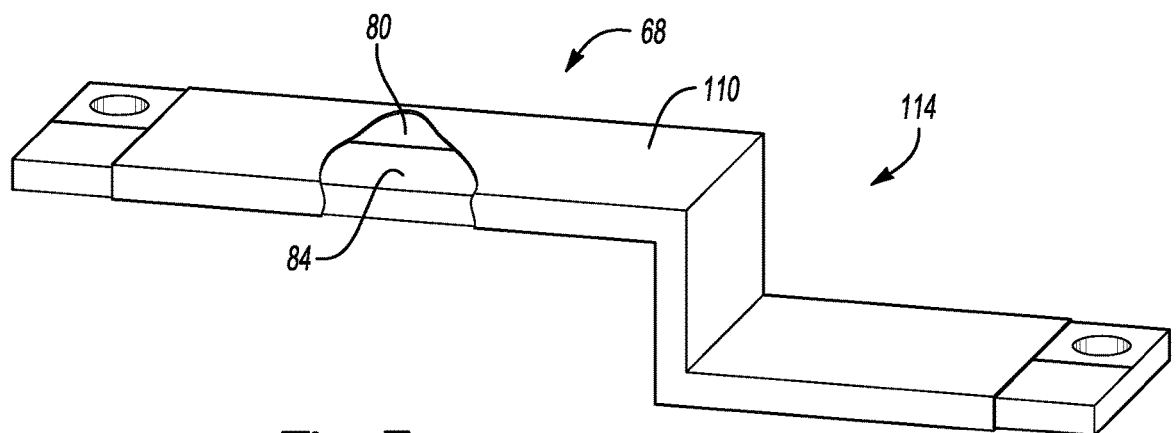
FIG. 7 illustrates the busbar assembly of FIG. 6 incorporating a bent portion.

Referring now to FIG. 7, in yet another example, the busbar assembly 68 can include a bent portion 114. Cladding 110 (FIG. 6) could cover the bent portion 114 or could be omitted.

Incorporating the bent portion 114 could be required to connect the busbar assembly 68 to structures other than the terminals 64, such as structures outside the traction battery pack 14. The bent portion 114 could be additionally required to accommodate position of the terminals 64 connecting to the busbar assembly 68. Further, the bent portion 114 can facilitate packaging the busbar assembly 68 within a vehicle.

Figure 8:
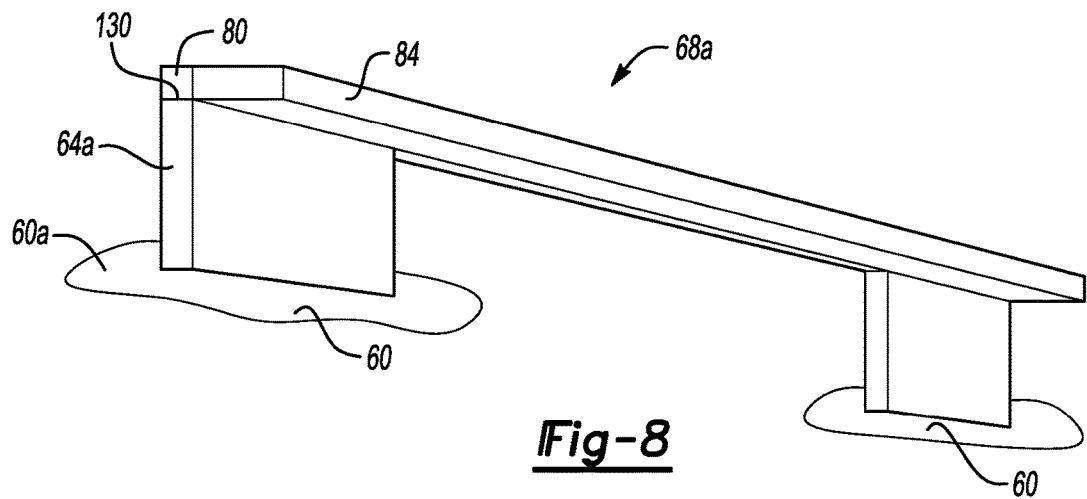
FIG. 8 illustrates a busbar assembly according to another exemplary embodiment.

Referring now to FIG. 8, another exemplary busbar assembly 68a is similar in construction to the busbar assembly 68 of FIGS. 2 to 5, but secured to terminals 64a of battery cell assemblies 60a via a weld along a weld interface 130. The weld interface 130 is between the terminals 64a and a first strip 80a of the busbar assembly 68a.

A second strip 84a of the busbar assembly 68 could additionally weld to the terminals 64a. However, the primary interface relied on for communicating electrical current between the terminals 64a and the busbar assembly 68 is the weld interface 130, which is between the first strip 80a and the terminals 64a.

Features of some of the disclosed examples include a relatively light-weight busbar that includes dissimilar materials. The dissimilar materials are formed as strips. The strips are bonded to each other such that current within the busbar can be shared between the strips.

An all copper busbar assembly having a given cross-section can be replaced with, for example, a replacement busbar assembly having a strip of copper and a strip of aluminum. The replacement busbar assembly may have a greater cross-section than the all copper busbar assembly, but would still provide a significant weight reduction compared to the all copper busbar.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A busbar assembly, comprising:
a first strip including a first material; and
a second strip including a second material different than the first material, the first strip extending continuously from a first connector portion to a second connector portion, the first connector portion configured to electrically connect to a first structure, the second connector portion configured to electrically connect to a second structure, the first and second strips both configured to communicate electric current.

2. The busbar assembly of claim 1, wherein the second strip is directly adjacent to the first strip.

3. The busbar assembly of claim 1, wherein the second strip is bonded directly to the first strip.

4. The busbar assembly of claim 1, wherein the first material and the second material are a metal or a metal alloy.

5. The busbar assembly of claim 4, wherein the first material comprises copper and the second material comprises aluminum.

6. The busbar assembly of claim 1, wherein the first material forms a non-conductive oxide layer under given atmospheric conditions at a first rate, and the second material forms a non-conductive oxide layer under the given atmospheric conditions at a second rate that is faster than the first rate.

7. The busbar assembly of claim 1, wherein the first structure is as a first traction battery terminal and the second structure is a second traction battery terminal, the first connector portion of the first strip secured directly to the first traction battery terminal, the second connector portion of the first strip secured directly to the second traction battery terminal.

8. The busbar assembly of claim 7, wherein the first and second strips extend nonlinearly from the first traction battery terminal to the second traction battery terminal.

9. The busbar assembly of claim 1, wherein the first strip extends from the first to the second connector portion along a longitudinal axis, and a cross-sectional area of a section taken perpendicular to the longitudinal axis remains consistent from the first to the second connector portion.

10. The busbar assembly of claim 1, wherein the first strip has an overall longitudinal length that is the same as an overall longitudinal length of the second strip.

11. A current communication method, comprising:
communicating electrical current using both a first strip and a second strip of a busbar, the first strip made of a first material and bonded to the second strip made of a second material along a bond interface, the first strip extending continuously from a first connector portion electrically contacting a first structure to a second connector portion electrically contacting a second structure the bond interface extending continuously from the first connector portion to the second connector portion.

12. The current communication method of claim 11, wherein the second strip extends continuously from the first structure to the second structure.

13. The current communication method of claim 11, wherein the first strip extends from the first to the second connector portion along a longitudinal axis, and a cross-sectional area of a section of the busbar taken perpendicular to the longitudinal axis remains consistently sized from the first to the second connector portion.

14. The current communication method of claim 11, wherein the first material and the second material are metallic materials, and the first strip is metallurgically bonded to the second strip along an entire longitudinal length of the busbar.

15. The current communication method of claim 11, wherein the first material comprises copper and the second material comprises aluminum.

16. The current communication method of claim 11, wherein the first strip has an overall longitudinal length that is the same as an overall longitudinal length of the second strip.

17. The busbar assembly of claim 10, wherein the first and second connector portions each provide an aperture configured to receive a respective terminal connector, wherein an entire circumferential perimeter of each of the apertures is provided by the first strip.

18. The busbar assembly of claim 1, wherein the first and second connector portion are provided entirely within the first strip such that the second strip provides no portion of the first connector portion and no portion of the second connector portion.

19. The busbar assembly of claim 1, wherein a total cross-sectional area of a section of the first strip that is taken perpendicularly to a longitudinal axis of the first strip is less than a total cross-sectional area of a section of the second strip that is taken perpendicularly to a longitudinal axis of the second strip.

20. The busbar assembly of claim 1, wherein the first strip is directly bonded to the second strip along a bond interface that has an overall longitudinal length that is the same as the overall longitudinal length of the first strip and the second strip, the bond interface extending continuously from the first connector portion to the second connector portion.

\* \* \* \* \*